E. S. COLE.
RECORDING DEVICE.
APPLICATION FILED APR. 5, 1910.
1,053,086.
Patented Feb. 11, 1913.
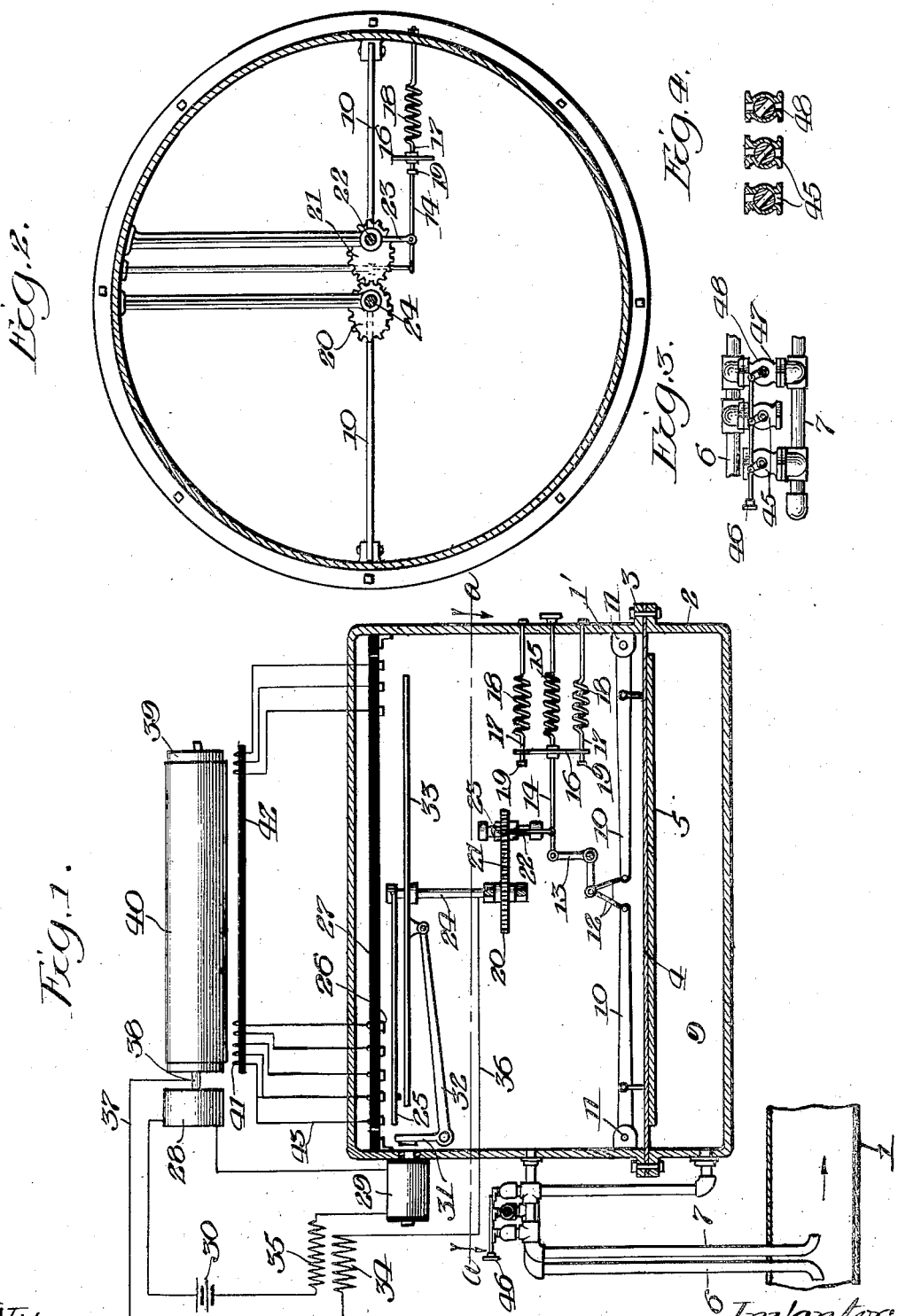

UNITED STATES PATENT OFFICE.

EDWARD S. COLE, OF UPPER MONTCLAIR, NEW JERSEY.

RECORDING DEVICE.

1,053,086.  Specification of Letters Patent.  Patented Feb. 11, 1913.

Application filed April 5, 1910. Serial No. 553,568.

*To all whom it may concern:*

Be it known that I, EDWARD S. COLE, a citizen of the United States, residing at Upper Montclair, in the county of Essex and State of New Jersey, have invented a certain new and useful Improvement in Recording Devices, of which the following is a full, clear, concise, and exact description, reference being had to the accompanying drawings, forming a part of this specification.

My invention relates to recording devices and more particularly to devices of this kind for measuring and recording the speed or velocity of flowing streams.

My invention further relates to that class of velocity meters in which the operation of the meter is accomplished by communicating to it, the dynamic or speed pressure of the flowing stream and also the static pressure of the same. In my application Serial No. 546,580, filed Feb. 28th, 1910, I show a device of this character in which I use a series of drums communicating with each other in combination with an electrical spark recording device. In another application of mine, Serial No. 494,751, filed May 8, 1909, I show a recording device of this general character, in which a flexible diaphragm is employed to secure a preliminary movement to indicate differences or variations in speed or velocity of the flowing stream; and in said application I show a parabolic gear for compensating for decreased movement of the diaphragm as the velocity pressure increases.

In the present application, in the arrangement shown for carrying out the invention herein, I employ a flexible diaphragm and a spark recording mechanism, and novel mechanism coöperating therewith to bring about certain desirable and advantageous results, as will more fully appear hereinafter. It will be understood, however, that the broader features of the invention can be carried out by mechanism other than that herein set forth.

I will describe my invention more in detail by reference to the accompanying drawing, illustrating one embodiment thereof in which:

Figure 1 is a side elevation partly in section of my improved device; Fig. 2 is a sectional view on lines *a a* of Fig. 1; and Figs. 3 and 4 are details of an improved controlling device.

Referring more particularly to Fig. 1, I show a pipe 1, within which there is a flowing stream whose velocity my device is adapted to measure and whose changing velocity my improved device is designed to record. The measuring device commonly called a pitometer consists of a casing 1', having a lower cover plate 2 bolted thereto by the bolts 3 and having between these two portions a thin diaphragm 4 provided with a stiffening plate 5. This diaphragm divides the pitometer proper into two compartments and inequalities of pressure between the two compartments are registered by means of lever mechanism to be presently explained. A pipe 6 and a pipe 7 connect this pitometer to the pipe or tunnel 1, within which the water flows, and whose velocity it is desired to measure and record. The pipe 6 communicates with the upper chamber 8 of the pitometer and the pipe 7 with the lower chamber 9. The pipe 6 faces up stream and registers the dynamic pressure of the stream and the pipe 7 faces down stream and registers the static pressure of the flowing stream. It will be apparent from this that the velocity of the stream can be recorded from these two readings. The greater pressure is in the chamber 8, and the diaphragm 4 moving in response to this greater pressure actuates two levers 10, 10 which are suitably pivoted at 11, 11 and which carry links 12, 12 acting upon a bell-crank lever 13, which bell-crank lever by means of a link 14 is held in its limiting position by the spring 15. The crosshead 16 is carried by the link 14 and has openings through which stems 17 can freely slide, which stems 17 are part of the springs 18 suitably fastened to the casing 1'. When the lever 13 has been moved in a counter-clockwise direction a sufficient distance, the crosshead 16 engages the two heads 19 and picks up the two springs 18 and thereby increases the tension to which said lever 13 is subjected and thereby inceases the scale over which the device can give reading, due to the retardation of the diaphragm in its movement at its outward or extreme positions, so that for high speeds or velocities of the flowing stream the diaphragm movement will be less per unit increase in velocity. Further to augment the scale or rather to give a lesser movement of the pointer at or near its limiting position, I employ two parabolic or elliptical gears 20 and 21, the gear 21 being mounted upon the shaft 22, said shaft likewise carrying a lever 23, which lever is attached to the link 14, so that the movement of the diaphragm at its outward positions, reduced as it is at such positions by the cumulative action of the springs 18, produces a movement of the remainder of the apparatus for recording purposes less in extent for the same movement of the diaphragm. It will thus be seen that the movement of the link 14 is communicated to the gear 21, which thereupon rotates the gear 20, thus rotating the latter's shaft 24.

The shaft 24 carries a pointer or finger 25 which moves circularly around a plurality of contact elements 26 mounted upon a strip of insulation 27. It will be seen that the pointer 25 thus moves over said contacts without frictional engagement therewith. At predetermined times controlled preferably by a suitable clock mechanism 28, whose details it is not thought necessary to describe, a magnet 29 is operated through the agency of a battery 30. This magnet acts upon an armature 31 mounted upon a bell-crank lever 32, which bell-crank lever actuates a circular disk 33 slidable loosely upon the shaft 24, which plate 33 then presses against the spring like pointer or contact finger 25 and causes it to contact with whatever contact element 26 it happens to be over. This closes an electrical circuit through the secondary winding 34 associated with a primary winding 35 in the magnet circuit, which secondary winding has one conductor 36 connected to the shaft 24 and the other conductor 37 connected to the shaft 38, controlled by the clock 28 continuously rotating a metallic cylinder 39. This metallic cylinder carries a strip of paper 40 and whenever contact is established, a spark jumps across from one of the contact points 41 which are suitably mounted upon an insulating plate 42 to the metallic cylinder 39, thereby puncturing the paper 40.

It will of course be understood that the contact elements 41 are associated each to each with corresponding contact elements 26 by means of conductors 43. From the description thus given it will be seen that a practically frictionless pointer 25 is under the control of the diaphragm 4, which pointer is periodically brought into contact with the elements 26, registering at a given time therewith, thus causing a puncture of the paper 40 corresponding to the position occupied by said pointer or indicator 25.

By virtue of the springs 17 and 18 and the parabolic or elliptical gears, a greater movement of the levers 10 is necessary when at or near their limiting positions to effect a unit movement of the pointer 25 thus to increase the scale over which my device is usable, so that in the arrangement shown for example, any desired portion of the record can be made at a selected or preferred scale up to a certain predetermined speed or velocity of the flowing stream, and after that a reduced scale can be employed, due to the reduced recording action of the reduced diaphragm movements, thus allowing the instrument or device to be used not only for comparatively low or small speeds, but also for relatively high or great velocities, and thus extending very greatly the range of use of the instrument.

When turning on the pressure into the device, it is necessary that the diaphragm be subjected only to the difference in pressure as otherwise the large pressure in either the tubes 6 or 7, if one alone is prematurely applied to the diaphragm, would rupture said diaphragm. To overcome this objection and to provide further means to guard against rupturing the delicate diaphragm and recording apparatus, I provide the following mechanism: This consists of blow-off pipes 44, one for each tube 6 and 7, which blow-off pipes have valves 45 therein, conjointly controlled by a handle 46, and a shunt or by pass tube 47, also having a valve 48 likewise controlled by the handle 46. It will be seen therefore, that the two valves 45 operate simultaneously to either shut off or supply pressure simultaneously to the two chambers 8 and 9. At the same time the by pass valve 48, as shown more clearly in Fig. 4 has a larger internal opening and thus opens sooner than the valves 45 and closes later than these valves to equalize the pressure by giving a short path for liquid between the tubes 6 and 7, thereby in operating said valves to equalize the pressure between the chambers 8 and 9 until these valves are in their closed position, at which time the by pass valve is of course entirely closed. The blow off pipes, of course, are used to eliminate the intervening air.

While I have herein shown and particularly described one embodiment of my invention, I do not, of course, mean to limit myself to the precise construction and arrangement as herein set forth, but

Having thus described my invention, what I claim as new and desire to secure by Letters Patent is:

1. A device of the character described having pressure chambers, a diaphragm separating said chambers, sources of unlike fluid pressure, means for communication between said sources and said chambers, an arm responsive to movements of said diaphragm, resilient means to restrain the movement of said arm, and parabolic gear mechanism interposed between said diaphragm and said arm.

2. A device of the class described, comprising in combination a casing, a pressure responsive device mounted in said casing, means for applying variable pressure to said device, an arm pivoted in said casing, mechanism for transmitting the movements of said device to said arm, and a plurality of tension springs attached to said mechanism and means whereby said springs are placed under tension one after the other as said device moves from its normal position.

3. A device of the character described having pressure chambers, a diaphragm separating said chambers, sources of unlike fluid pressure, means for communication between said sources and said chambers, an indicator responsive to movements of said diaphragm, spark operated recording mechanism under the control of said indicator, and means to periodically operate said spark mechanism.

4. A device of the character described having pressure chambers, a diaphragm separating said chambers, tubes communicating with said chambers, a blow-off valve in each tube, and means for conjointly and simultaneously actuating said valves.

5. A device of the character described having pressure chambers, a diaphragm separating said chambers, tubes communicating with said chambers, a blow-off valve in each tube, a passage between said tubes and a valve in said passage.

6. A device of the character described having pressure chambers, a diaphragm separating said chambers, tubes communicating with said chambers, a blow-off valve in each tube, a passage between said tubes, a valve in said passage, and means to conjointly actuate all said valves.

7. A device of the character described having pressure chambers, a diaphragm separating said chambers, tubes communicating with said chambers, a blow-off valve in each tube, a passage between said tubes, a valve in said passage, means whereby said valve is open before and closed after said aforesaid valves, and means to conjointly actuate all said valves.

8. A device of the character specified, having means for recording the variations in velocity of a flowing stream, and also having mechanism for changing the scale in which said record is made.

9. A device of the class specified, having means for recording variations in velocity in a flowing stream, and also having mechanism whereby different parts of the record are formed in different scales.

10. A device of the class specified, having a member movable upon variations in the velocity of a flowing stream, and also having a second movable member and mechanism for communicating the movement of the first member to the second, and means for restraining the outward or extreme movements of the first member relatively to the inner or near movements thereof.

11. A device of the class specified, comprising a casing, a diaphragm separating said casing into pressure chambers, means for restraining certain of the diaphragm movements relatively to the others, and mechanism controlled by the diaphragm movements.

12. A device of the class specified, comprising a casing, a flexible diaphragm dividing said casing into pressure chambers, means for restricting certain movements of said diaphragm relatively to others, a swinging finger, and means for swinging said finger by said diaphragm movements.

13. A device of the class specified, comprising a casing, a flexible diaphragm dividing said casing into pressure chambers, spring means arranged to act cumulatively upon said diaphragm, a rotary finger and gearing and connections for operating said finger upon the movements of the diaphragm.

14. A device of the class specified, comprising a casing, a flexible diaphragm dividing said casing into pressure chambers, spring means arranged to act cumulatively upon said diaphragm, a rotary finger and gearing, connections for operating said finger upon the movements of the diaphragm, and electrically operated recording mechanism controlled by said finger.

15. A device of the class specified, comprising a casing, a flexible diaphragm dividing said casing into pressure chambers, spring means arranged to act cumulatively upon said diaphragm, a rotary finger and gearing, connections for operating said finger upon the movements of the diaphragm, and electrically operated recording mechanism controlled by said finger, said recording mechanism involving a series of contacts arranged to be connected with by said finger, and means for actuating the finger to bring it intermittently into position to make connection with said contacts.

16. A device of the class specified, having means comprising a casing, a diaphragm separating said casing into pressure chambers, and mechanism controlled by the movements of said diaphragm, said mechanism having means whereby its extent of operation is varied for like movements of the diaphragm.

17. A device of the class specified, having means comprising a casing, a diaphragm separating said casing into pressure chambers, and mechanism controlled by the movements of said diaphragm, said mechanism having means whereby its extent of operation is lessened or reduced for like movements of the diaphragm.

18. A device of the class specified, comprising a casing, a diaphragm dividing said casing into pressure chambers, mechanism controlled by said diaphragm, said mechanism containing elliptical gears to change the effect of the diaphragm movements.

19. A device of the class specified, comprising a casing, a diaphragm dividing said casing into pressure chambers, levers 10—10 associated with said diaphragm, a bell crank 13 arranged to be actuated by said levers, cumulatively arranged springs 15 and 18, coöperating with said diaphragm to restrict the movement thereof, elliptical gears 20 and 21 arranged to be actuated by the bell crank 13, a finger 25 controlled by said gears 20 and 21, an insulating strip 27 having a series of contacts 26, with which said finger 25 may make connection, a disk 33 arranged to actuate said finger 25 to bring it into position to make contact with said contacts 26, an electro-magnet 29 to actuate said disk 33, a record 40 on a recording cylinder 39, spark contacts 41 connected with the contacts 26, said contacts 41 being arranged to form a spark record on the sheet 40, and a clockwork 28 for rotating the cylinder 39 and intermittently operating the circuit of the magnet 29.

20. A device of the class specified, comprising a casing, a diaphragm dividing said casing into pressure chambers, and mechanism for recording the diaphragm movements, said mechanism having means for reducing the extent of movement of the outward movements of the diaphragm, and also having means for reducing the scale in which said reduced movements are recorded.

In witness whereof, I hereunto subscribe my name this 25th day of March A. D., 1910.

EDWARD S. COLE.

Witnesses:
MAX W. ZABEL,
HAZEL JONES.